(12) United States Patent  
Tuttle et al.

(10) Patent No.: US 6,592,807 B2
(45) Date of Patent: Jul. 15, 2003

(54) METHOD OF MAKING A POROUS TIRE TREAD MOLD

(75) Inventors: James Robert Tuttle, Hudson, OH (US); Thomas John Rood, Kent, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 0 days.

(21) Appl. No.: 09/864,915

(22) Filed: May 24, 2001

(65) Prior Publication Data

US 2002/0176792 A1 Nov. 28, 2002

(51) Int. Cl.[7] ............................. B22F 3/12; B22F 3/04
(52) U.S. Cl. ................................ 419/2; 419/49; 419/26
(58) Field of Search ............................ 419/38, 2, 26, 419/49

(56) References Cited

U.S. PATENT DOCUMENTS

| | | |
|---|---|---|
| 1,797,580 A | 3/1931 | Hopkinson et al. |
| 2,161,281 A | 6/1939 | Carter .......................... 18/58 |
| 2,835,572 A | 5/1958 | Isbenjian et al. ............. 75/200 |
| 3,101,514 A | 8/1963 | Callender et al. .............. 22/10 |
| 3,623,630 A * | 11/1971 | Rode .......................... 220/64 |
| 3,804,566 A | 4/1974 | Kimura et al. ................. 425/28 |
| 4,134,759 A * | 1/1979 | Yajima et al. ................. 75/204 |
| 4,174,364 A | 11/1979 | Balosetti ..................... 264/111 |
| 4,740,145 A | 4/1988 | Shurman .................... 425/28.1 |
| 5,405,570 A | 4/1995 | Fuma et al. .................... 419/2 |
| 5,623,727 A | 4/1997 | Vawter ........................ 419/51 |
| 5,625,861 A | 4/1997 | Nishi ............................ 419/2 |
| 5,798,076 A | 8/1998 | Ladouce ..................... 264/326 |
| 5,841,041 A | 11/1998 | Asano et al. ................. 75/229 |
| 5,850,590 A | 12/1998 | Furuta .......................... 419/49 |
| 6,200,514 B1 * | 3/2001 | Meister ....................... 264/401 |

FOREIGN PATENT DOCUMENTS

| | | | | |
|---|---|---|---|---|
| EP | 0868955 A1 | * | 7/1998 | ........... B22F/3/105 |
| WO | WO88/01927 | * | 9/1988 | ........... B29C/33/10 |

* cited by examiner

Primary Examiner—Daniel J. Jenkins
(74) Attorney, Agent, or Firm—Brouse McDowell; Roger D. Emerson

(57) ABSTRACT

A method of making a tire mold segment with a porous metal tread surface for a tire mold wherein an annular segmental tire model of refractory material is formed with tire model segments which are used to shape and form each tire mold segment from powdered metal by applying heat and pressure to sinter the powdered metal as it is shaped by the tire model segment. Blades may be mounted in the tire model segments for transfer to the tire mold segments for molding slits a tire tread.

6 Claims, 5 Drawing Sheets

METHOD OF MAKING A POROUS TIRE TREAD MOLD

BACKGROUND OF THE INVENTION

1. Field of Invention

This invention relates to tire molds and especially to the method of making mold segments of sintered powdered metal from tire model segments of a refractory material utilizing pressure vessels and heaters.

2. Description of the Related Art

In the manufacture of tires the composite rubber reinforced article is vulcanized under heat and pressure. During this operation, it is important that the gases and moisture be vented and not trapped in the tire where this may cause the tire to fail. It has been found that metal parts made from powdered metal have pores which have the capability of absorbing gases during a molding process. This property has been utilized in molding and casting by forming and compressing parts under pressure in various applications shown and described in U.S. Pat. No. 5,850,590. Also in U.S. Pat. No. 5,623,727 parts have been made by using a model or forging die on a moveable ram for shaping and forming a part from powdered metal. In U.S. Pat. No. 5,625,861 a process is disclosed for producing a porous metal body by shaping powdered metal in a capsule under pressure.

The object of this invention is to provide a segmental tire mold with porous molding surfaces to absorb gases and moisture during curing of a tire without the necessity of providing vents which may be filled with rubber and result in projecting fingers on the tire which need to be trimmed. The absorption of gases and moisture in the pores of the mold can also be provided in locations where it is difficult to provide vents.

SUMMARY OF THE INVENTION

In accordance with one aspect of the invention, there is provided a method of making a porous metal tread segment for a tire mold from metal powder comprising:

(a) forming a segmented tire mold model of refractory material;
(b) mounting the model in a milling machine;
(c) cutting a tread surface in the model;
(d) compacting the metal powder against a segment of the model to form the tread segment;
(e) heating the tread segment to sinter the metal powder; and
(f) machining the tread segment for mounting in a segmental tire mold mechanism.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, preferred embodiments of which will be described in detail in this specification and illustrated in the accompanying drawings which form a part hereof and herein.

DESCRIPTION OF THE PREFERRED EMBODIMENTS

Figure 1:
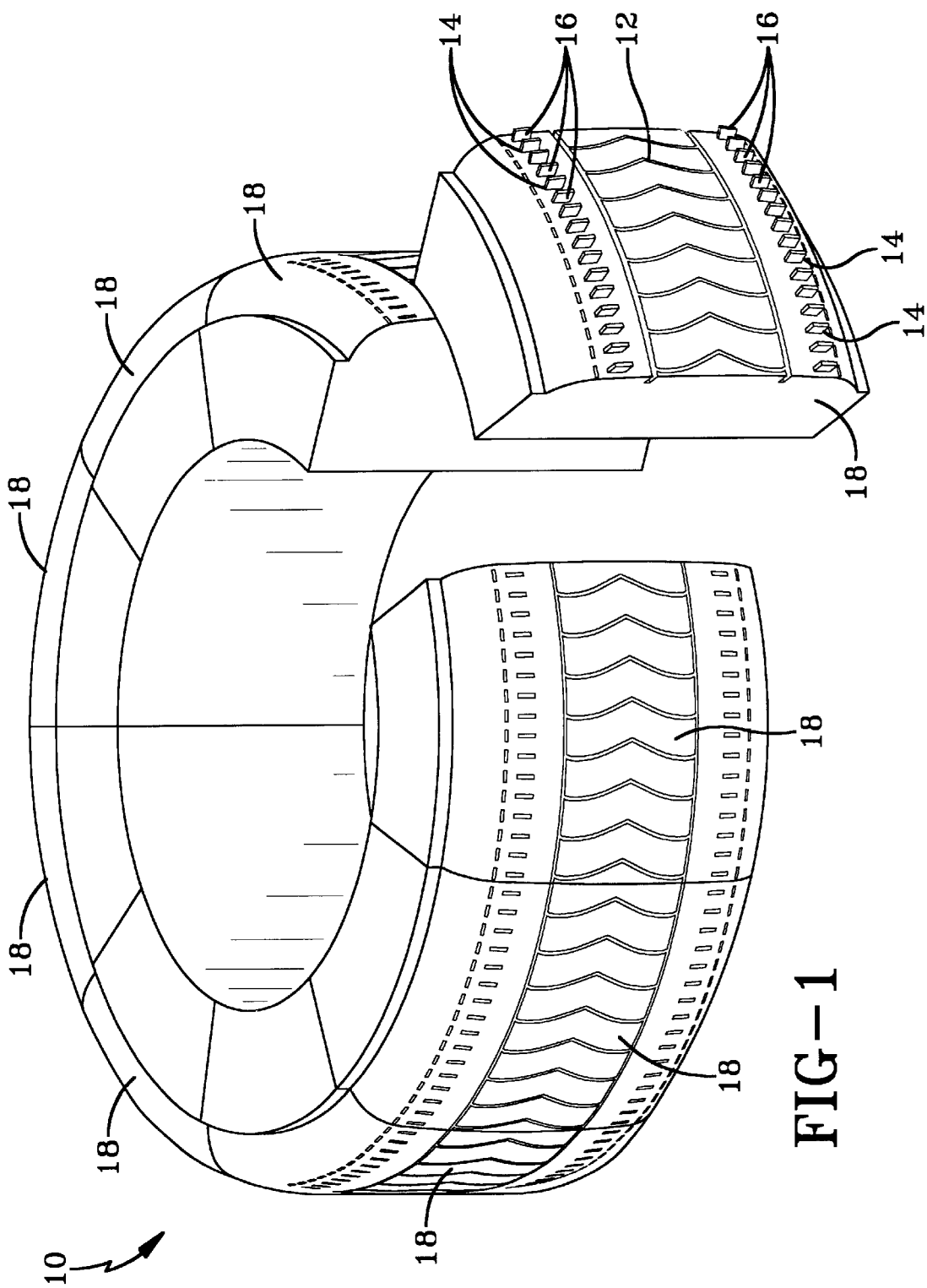
FIG. 1 is a schematic view in perspective showing a tire mold model with one segment broken away.

Referring now to the drawings wherein the showings are for the purpose of illustrating preferred embodiments of the invention only and not for purpose of limiting the same FIG. 1 shows a segmental tire mold model 10 which is machined from a refractory material such as graphite with a tread pattern 12 cut into the outer surface. Slots 14 may also be milled in the surface for insertion of blades 16. The tire mold model 10 is divided into tire model segments 18 each of which may then be used as a model or forging die to provide the mold cavity in a tire mold segment 20.

Figure 2:
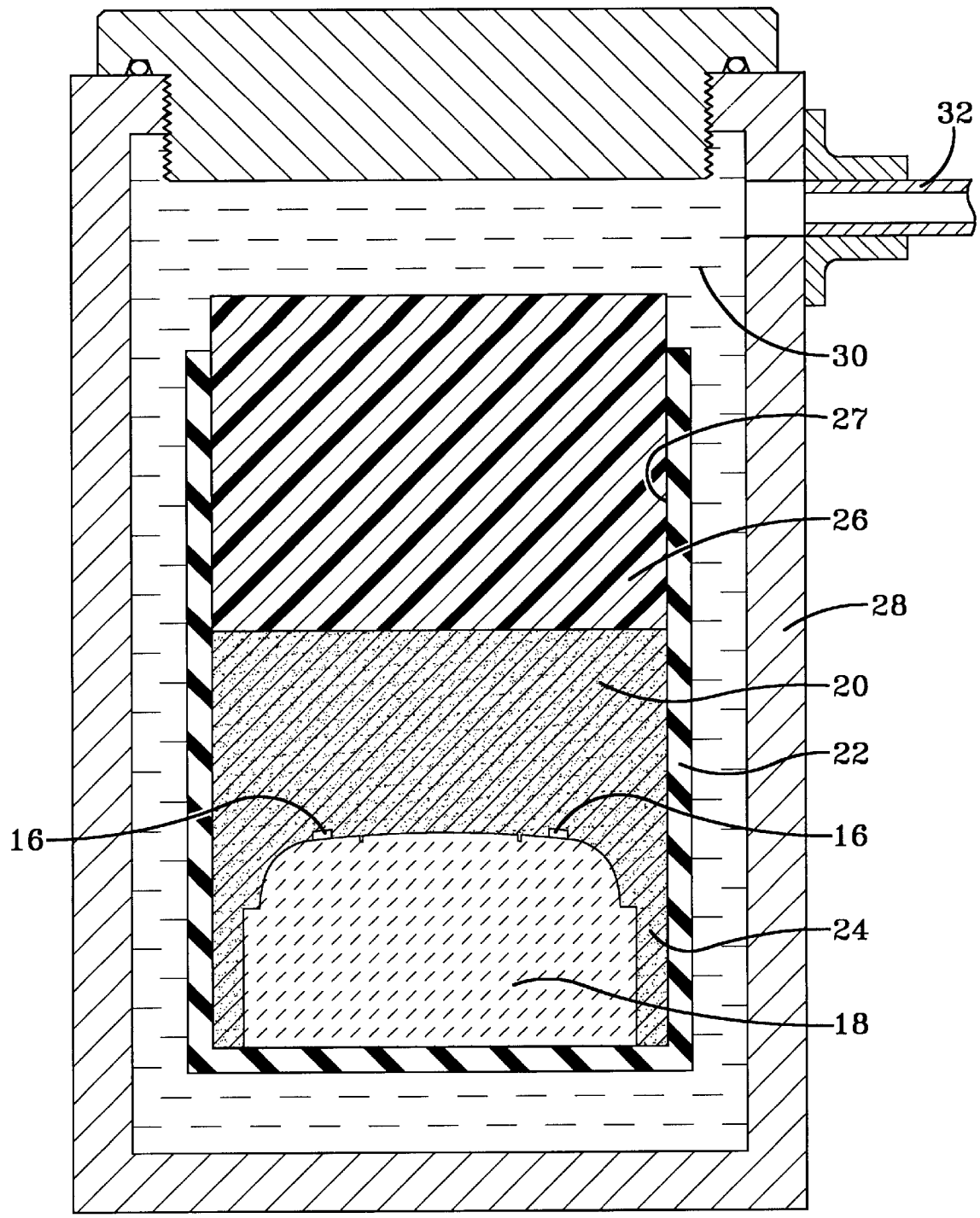
FIG. 2 is a schematic view showing the forming of the tire mold segment by the tire model segment utilizing cold isostatic pressing of the powdered metal.

As shown in FIG. 2 the mold segment 20 is made by a cold isostatic compaction and sintering process. A tire model segment 18 is placed in a flexible mold such as a rubber bag 22, a metal or alloy powder 24 is placed in the bag around the tire model segment and a plug 26 provided to close an opening 27 in the rubber bag. The model segment 18 and metal powder 24 in the bag 22 are then placed in a high-pressure chamber 28, which is filled with a fluid such as oil 30. High pressure is applied to the powdered metal forming a tire mold segment 20 by communicating the oil 30 under pressure through a conduit 32, to the chamber 28 for a predetermined period of time. This compacts the powder 24 against the model segment 18 to form the tread segment 20. The fragile green tire mold segment 20 is then removed from the high pressure chamber 28 and from the rubber bag 22 and placed in a continuous batch furnace where it is sintered at high temperatures which creates interparticle welds and forms a high strength metallurgical part. The sintered tire mold segment 20 may contain the blades 16 which remain fastened to the tire mold segment surface after the graphite model segment 18 has been removed. The tire mold segment 20 may then be machined to a shape such as that shown in FIG. 5.

Figure 3:
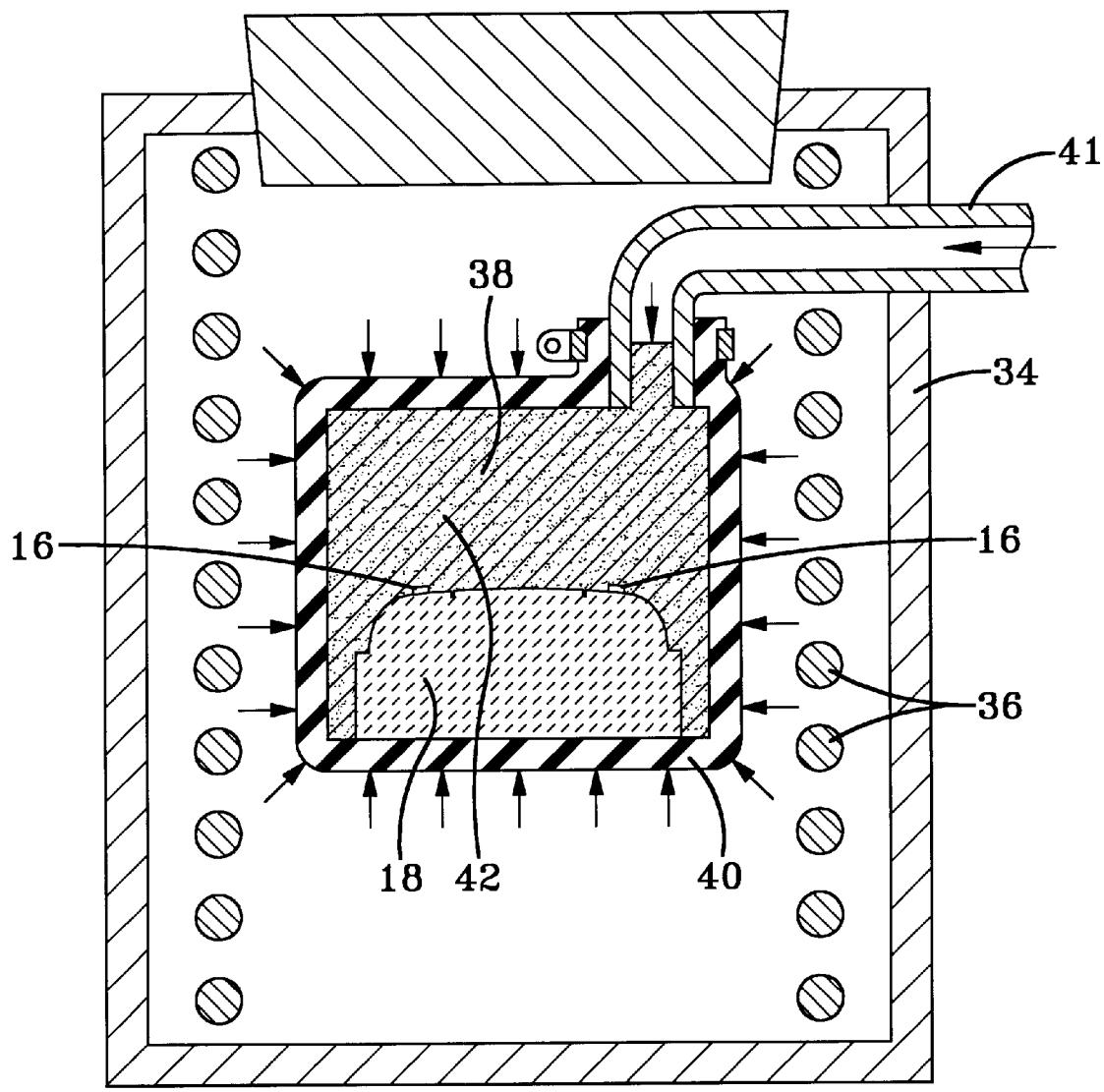
FIG. 3 is a schematic view showing the forming of the tire mold segment by the tire model segment utilizing hot isostatic pressing of the powdered metal.

Referring to FIG. 3 equipment for making a tire mold segment 42 by a hot isostatic process is illustrated in which the tire model segment 18 is placed in a pressure vessel such as an uniaxial press 34 with heaters 36 for heating the model segment and powdered metal 38 in a flexible container 40 while under pressure from a source outside the pressure vessel through a conduit 41 to compact the powdered metal 38 against the model segment 18 to shape a tire mold segment 42. The powdered metal 38 is then be sintered to provide the optimum physical properties for the tire mold segment 42. Here again the blades 16 remain in the tire mold segment 42 after it is sintered. The resulting tire mold segment 42 may then be removed from the pressure vessel 34 and the container 40 so that the tire model segment 18 can be removed and the tire mold segment 42 machined in the same manner as described for the segment 20 shown in FIG. 5.

Figure 4:
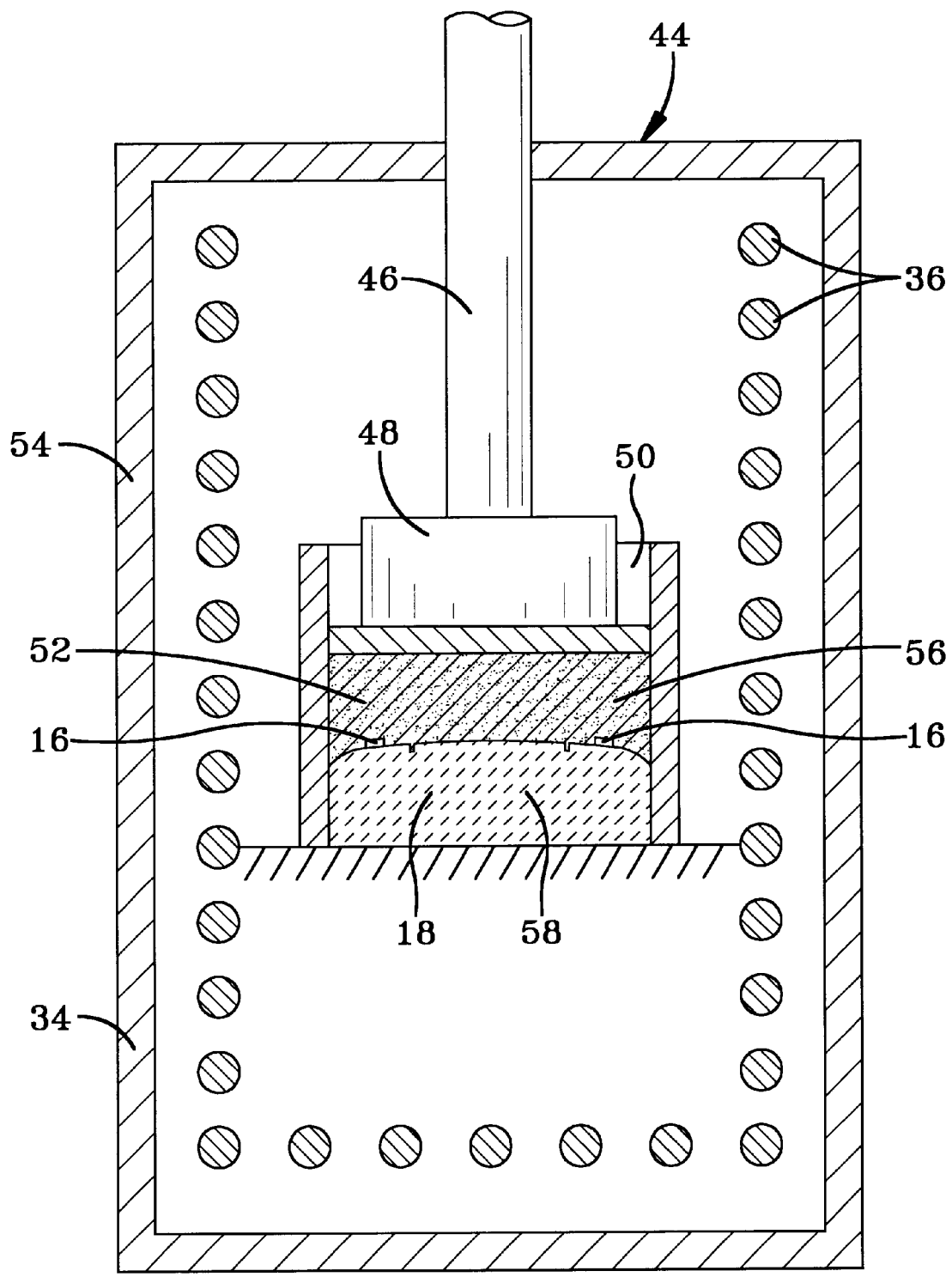
FIG. 4 is a schematic view showing the forming of the tire mold segment by the tire model segment utilizing a hydraulic uniaxial press.

Referring to FIG. 4 a pseudo-isostatic compaction process is illustrated in which the tire model segment 18 is placed in a press 44 with a hydraulic ram 46, having a top punch 48 extending into a die cavity 50 for compressing powdered metal 52 against the tire model segment 18. This may be done in a container 54 having heaters 36 to heat the compressed powdered metal 52 forming a tire mold segment 56. Doing the sintering process the blades 16 in the tire model segment 18 may be transferred to the tire mold segment 56 and become a part of the tire mold segment after the pressure and sintering process is completed.

Prior to compaction and sintering an appropriate release coating is applied to the tire model segments 18 and since they are designed with no undercuts and a minimum amount of draft at all points the tire mold segments 42 and 56 should separate from the tire model segments 18 without fracture of the model segments. A hydraulic press (not shown) may be used to remove the model segments 18 from the mold segments 42 and 56, if needed.

Figure 5:
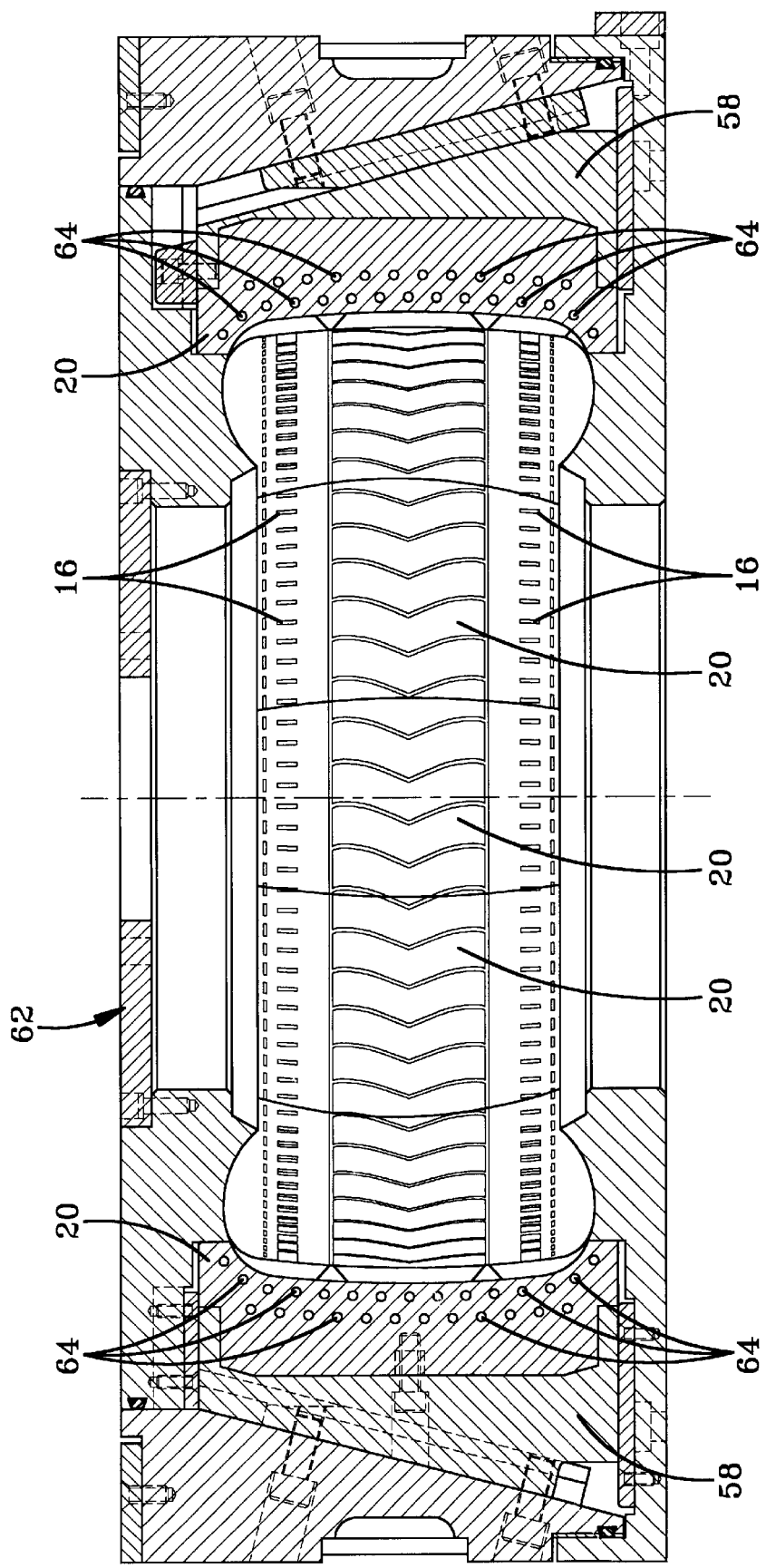
FIG. 5 is a cross-section of a self-venting tire mold having machined porous tire mold segments made in accordance with the method of the invention.

After forming the sides, back surfaces and the S-diameter surface the tire mold segments 42 and 56 can be finish machined and the mold segments assembled with other segments into a common segmental mold mechanism 57 such as that shown in FIG. 5. The tire mold segments 20 are mounted on radially moveable press segments 58 having tapered actuating surfaces 60 for moving the segments radially upon opening and closing of the tire mold.

During vulcanization of a tire in the tire mold 62 the gases and moisture generated will be absorbed in pores 64 in the tire mold segments 20. After vulcanization and removal of the tire the gases and moisture may escape from the pores 64.

If desired a backing plate (not shown) may be positioned in back of each of the tire mold segments 42, 56 and the powdered metal 38 compacted against and welded to the backing plate during the sintering operation. This reduces the quantity of powdered material which must be sintered.

While certain representative embodiments and details have been shown for the purpose of illustrating the invention, it will be apparent to those skilled in the art that various changes and modifications may be made therein without departing from the scope of the invention.

What is claimed is:

1. A method of making porous metal tread segments for a tire mold from metal powder comprising:
   (a) forming a tire model of refractory material;
   (b) mounting said tire model in a milling machine;
   (c) cutting a tread surface in said tire model;
   (d) removing said tire model from said milling machine;
   (e) cutting said tire model into tire model segments;
   (f) compacting a metal powder against said tire model segments to form tread segments;
   (g) heating said tread segments to sinter said metal powder to make them porous; and
   (h) machining said tread segments for mounting in a segmented tire mold mechanism.

2. The method of claim 1 further characterized by said refractory material being graphite.

3. The method of claim 1 further characterized by said tread mold segments being formed by compacting said metal powder against said model segments in a uniaxial press and heating said tread mold segments to create interparticle welds with high strength.

4. The method of claim 1 further characterized by simultaneous heating and compacting said metal powder to make said tread segments.

5. The method of claim 1 further characterized by each of said model segments and said metal powder being placed in a flexible bag and located in a high pressure chamber in a uniaxial press and heat and pressure being applied to said chamber to compact said metal powder against each of said model segments to shape said tread segments and create interparticle welds in a porous material.

6. The method of claim 1 further characterized by slots being cut in said tire model and blades inserted in said slots after cutting said tread surface in said model whereby after sintering of said metal powder and forming said tread segments said blades will be embedded in said tread surface of said tread segments for forming slits in tires molded with said tread segments.

* * * * *